United States Patent
Kikukawa et al.

(10) Patent No.: US 7,554,894 B2
(45) Date of Patent: Jun. 30, 2009

(54) DATA RECORDING AND READINGOUT SYSTEM

(75) Inventors: Takashi Kikukawa, Tokyo (JP);
Narutoshi Fukuzawa, Tokyo (JP);
Tatsuhiro Kobayashi, Tokyo (JP);
Toshiki Aoi, Tokyo (JP); Hajime Utsunomiya, Tokyo (JP)

(73) Assignee: TDK Corporation, Tokyo (JP)

( * ) Notice: Subject to any disclaimer, the term of this patent is extended or adjusted under 35 U.S.C. 154(b) by 743 days.

(21) Appl. No.: 11/217,294

(22) Filed: Sep. 2, 2005

(65) Prior Publication Data

US 2006/0062110 A1 Mar. 23, 2006

(30) Foreign Application Priority Data

Sep. 3, 2004 (JP) ............................. 2004-256764

(51) Int. Cl.
*G11B 7/00* (2006.01)

(52) U.S. Cl. ................................. 369/112.23

(58) Field of Classification Search ................. 369/118, 369/112.23, 13.33, 44.12, 44.23, 112.01
See application file for complete search history.

(56) References Cited

U.S. PATENT DOCUMENTS

| | | | |
|---|---|---|---|
| 6,181,478 B1 | 1/2001 | Mandella | |
| 6,577,584 B1 * | 6/2003 | Milster et al. | 369/118 |
| 7,330,404 B2 * | 2/2008 | Peng et al. | 369/13.33 |
| 2005/0105418 A1 | 5/2005 | Kuwahara et al. | |
| 2005/0169157 A1 | 8/2005 | Fukuzawa et al. | |
| 2005/0219994 A1 | 10/2005 | Fukuzawa et al. | |

FOREIGN PATENT DOCUMENTS

| | | |
|---|---|---|
| EP | 1 555 666 A1 | 7/2005 |
| JP | 8-235638 | 9/1996 |

(Continued)

OTHER PUBLICATIONS

Jooho Kim, et al. "Super-resolution by elliptical bubble formation with $PtO_x$ and AginSbTe Layers" Applied Physics Letters, vol. 83, No. 9, Sep. 1, 2003, American Institute of Physics, XP12035922, pp. 1701-1703.

(Continued)

*Primary Examiner*—Nabil Z Hindi
(74) *Attorney, Agent, or Firm*—Oblon, Spivak, McClelland, Maier & Neustadt, P.C.

(57) ABSTRACT

In a data recording and readingout system in which data is recorded and readout, or is readout on, or from an optical recording medium 1 by irradiating a laser beam having a wavelength "$\lambda$" via an objective lens of a numerical aperture "NA" onto said optical recording medium, while the optical recording medium contains a layered structure formed by sandwiching a dielectric layer 6 between a recording layer 7 and an optical absorption layer 5, with respect to the optical recording medium 1 arranged in such a manner that data recorded by a recorded mark train can be readout and the recorded mark train contains a recorded mark smaller than, or equal to a limit of resolution, the laser beam is irradiated via the objective lens and a solid immersion lens having a refractive index "n" which is positioned between the optical recording medium and the objective lens, so that the data is recorded and readout, or is readout with respect to the optical recording medium by a recorded mark train which contains a recorded mark smaller than, equal to "$\lambda/(4 \cdot n^2 \cdot NA)$."

8 Claims, 4 Drawing Sheets

FOREIGN PATENT DOCUMENTS

| | | |
|---|---|---|
| JP | 2004-87073 | 3/2004 |
| JP | 2004-220687 | 8/2004 |

OTHER PUBLICATIONS

T. Kikukawa, et al. "Rigid bubble pit formation and huge signal enhancement in super-resolution near-field structure disk with platinum-oxide layer", Applied Physics Letters, vol. 81, No. 25, Dec. 16, 2002, American Institute of Physics, XP12032788, pp. 4697-4699.

S. M. Mansfield, et al., "High-numerical-aperture lens system for optical storage", Optics Letters, vol. 18, No. 4, Feb. 15, 1993, pp. 305-307.

* cited by examiner

DATA RECORDING AND READINGOUT SYSTEM

BACKGROUND OF THE INVENTION

The present invention is related to a data recording and readingout system which records data on an optical recording medium, and readout data from the optical medium. More precisely speaking, the present invention is directed to such a data recording and readingout system capable of largely increasing a recording capacity of the optical recording medium.

Conventionally, optical recording media typically known as CDs and DVDs have been widely used as recording media employed so as to record thereon digital data. Very recently, such optical recording media having larger storage capacities and higher data transfer rates have been actively developed.

In the above-described optical recording media, wavelengths "λ" of laser beams which are employed so as to record and readout data are shortened and numerical apertures "NA" of objective lenses are increased so as to narrow diameters of laser beam spots, so that recording capacities of the optical recording media may be increased (refer to, for instance, Japanese Patent Publication JP-A-8-235638).

In an optical recording medium, if lengths of recorded marks recorded on the optical recording medium and a length between the adjoining recorded marks, namely, a length of a region where a recorded mark is not formed (will be referred to as "blank region" hereinafter) becomes smaller than a limit of resolution, then data cannot be readout from this optical recording medium.

A beam spot diameter of a laser beam is determined based upon a wavelength "λ" of the laser beam and a numerical aperture "NA" of an objective lens used to converge the laser beam, and thus, becomes "λ/NA." At this time, in such a case that a repetition frequency between a recorded mark and a blank region, namely, a spatial frequency becomes larger than, or equal to λ/2NA, both the recorded mark and data recorded on the blank region cannot be readout.

As a consequence, a length of a recorded mark and a length of a blank region which correspond to a readable spatial frequency become larger than, or equal to "λ/4NA", respectively, and when the laser beam having the wavelength "λ" is collected onto a surface of an optical recording medium by the objective lens having the numerical aperture "NA", both the recorded mark having the length of "λ/4NA" and the blank region having the length of "λ/4NA" may constitute both the shortest recorded mark and the shortest blank region, which can be read.

As previously explained, in the case that data is readout, there is a limit of resolution capable of readingout data, and also, there are certain limitations in a length of a recorded mark and a length of a blank region under which the data can be readout.

Accordingly, even when both small recorded marks and small blank regions are formed and data could be recorded, the recorded data cannot be readout. As a result, both the lengths of the recorded marks and the lengths of the blank regions which can be formed when the data are recorded on the optical recording media are necessarily limited, so that the recording capacities of the optical recording media can be very hardly increased.

SUMMARY OF THE INVENTION

As a consequence, an object of the present invention is to provide a data recording and readingout system capable of largely increasing a recording capacity of data onto an optical recording medium.

The above-described object of the present invention may be achieved by such a data recording and readingout system in which data is recorded and readout, or is readout, on or from an optical recording medium by irradiating a laser beam having a wavelength "λ" via an objective lens of a numerical aperture "NA" onto the optical recording medium, wherein: while the optical recording medium contains a layered structure formed by sandwiching at least a dielectric layer between a recording layer and an optical absorption layer, with respect to the optical recording medium arranged in such a manner that data recorded by a recorded mark train can be readout and the recorded mark train contains a recorded mark smaller than, or equal to a limit of resolution, the laser beam is irradiated via the objective lens and a solid immersion lens having a refractive index "n" which is positioned between the optical recording medium and the objective lens, so that the data is recorded and readout, or is readout with respect to the optical recording medium by a recorded mark train which contains a recorded mark smaller than, equal to "λ/(4·n²·NA)."

In the present invention, when the data recorded on the optical recording medium is readout, the data recording and readingout system has been arranged in such a manner that the laser beam having the wavelength "λ" is irradiated onto the optical recording medium via both the objective lens of the numerical number "NA" and the solid immersion lens having the refractive index "n." In such a case that the laser beam is irradiated onto the optical medium in the above-described manner, a spot diameter of the laser beam can be made small, and the limit of resolution can be decreased from "λ/4NA" to "λ/(4·n²·NA)." As a result, such a data which has been constituted by the smaller recorded mark train can be readout, as compared with such a case that the laser beam is irradiated via only the objective lens so as to readout the data.

In addition, in the present invention, the optical recording medium has been constituted by containing the layered structure formed by sandwiching at least the dielectric layer between the recording layer and the optical absorption layer. In the case that the optical recording medium has such a structure, even if the lengths of the recorded marks which constitute the recorded mark train and the lengths of the blank regions between the adjoining recorded marks are shorter than, or equal to the limit of restriction, the data can be readout from the optical recording medium.

As previously explained, in accordance with the present invention, the limit of resolution is decreased from "λ/4NA" to "λ/(4·n²·NA)", and in addition, such a data can be readout which has been constituted by the recorded mark train having the length which is shorter than, or equal to this decreased limit of resolution "λ/(4·n²·NA)." As a consequence, such a recorded mark train having a very short length which is shorter than, or equal to "λ/(4·n²·NA)" may be formed in order that the data can be recorded. As a consequence, the recording capacity of the optical recording medium can be largely increased.

In the present invention, the recording layer is preferably constituted in such a manner that when a laser beam which has been set to recording power is irradiated onto the recording layer, a volume change occurs in such a region that the laser beam is irradiated. Since the region where the volume of the recording layer has been changed owns an optical characteristic different from that of the region where the volume of the recording layer is not changed, the first-mentioned region may be utilized as the recorded mark.

The recording layer may be formed by containing a noble metal oxide, or a noble metal nitride as the major component.

In this specification, such an expression that a certain layer contains an element as a major component implies such a fact that a containing ratio of this element becomes the largest containing ratio among those of elements contained in this layer.

In the present invention, in such a case that the recording layer contains the noble metal oxide as the major component, it is preferable to irradiate the laser beam onto the optical recording medium so as to decompose the noble metal oxide into both a noble metal and oxygen, and to form bubble pit. Then, since very fine particles of the noble metal are dispersed inside the bubble pit, a recorded mark is formed, so that data may be recorded.

In the present invention, in such a case that the recording layer contains the noble metal oxide as the major component, it is preferable to employ a platinum oxide as the noble metal oxide.

The decomposition temperature of the platinum oxide is high, as compared with the decomposition temperatures of other noble metal oxides. As a consequence, when the laser beam which has been set to the recording power is irradiated so as to form the recorded mark, even in such a case that the heat is diffused from the region to which the laser beam has been irradiated to the peripheral portion thereof, it is possible to avoid that the decomposition reaction of the platinum oxide occurs in such a region other than the region to which the laser beam has been irradiated. As a consequence, the volume of the desirable region of the recording layer is changed, so that the recorded mark can be formed.

Also, in the case that a laser beam having high readout power is irradiated so as to readout data, since the decomposition temperature of the platinum oxide is high, as compared with the decomposition temperatures of other noble metal oxides, there is no risk that the platinum oxide is decomposed into both platinum and oxygen. As a consequence, even when the data recorded on the optical recording medium is readout in a repetition manner, there are no such risks that the shape of the recorded mark is changed, and also, the volume change is newly produced in the region other than the region where the recorded mark has been formed. As a result, the durability as to the readingout operation of the optical recording medium can be improved.

In the present invention, in such a case that the recording layer contains the noble metal nitride as the major component, it is preferable to employ a platinum nitride as the noble metal nitride which is employed so as to form the recording layer.

In the present invention, it is preferable to construct both a dielectric layer and an optical absorption layer in such a manner that both the dielectric layer and the optical absorption layer are deformed in connection with the volume change of the recording layer when a recorded mark train is formed on the recording layer.

An optical characteristic of such a region that both the dielectric layer and the optical absorption layer have been deformed is made different from an optical characteristic of such a region that both the dielectric layer and the optical absorption layer are not deformed. As a result, such a reproduction signal having a better signal characteristic can be obtained.

In accordance with the present invention, it is possible to provide the data recording and readingout system capable of largely increasing the recording capacity of the optical recording medium.

BRIEF DESCRIPTION OF THE DRAWINSG

FIG. 6($a$) is a sectional view for showing a partially enlarged portion of the optical recording medium before data is recorded; and FIG. 6($b$) is a sectional view for showing the partially enlarged portion of the optical recording medium after data has been recorded.

DETAILED DESCRIPTION OF THE PREFERRED EMBODIMENTS

Referring now to the accompanying drawings, preferred embodiment modes of the present invention will be described in detail.

Figure 1:
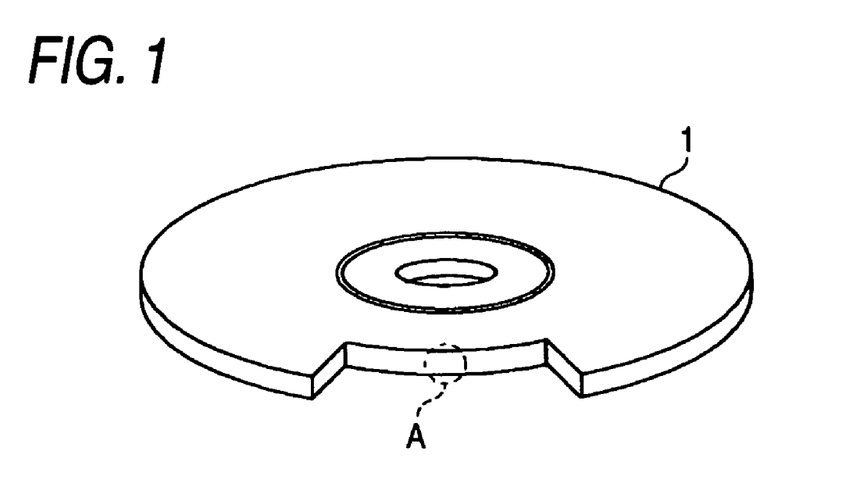
FIG. 1 is a perspective view for schematically showing an optical recording medium according to a preferred embodiment mode of the present invention.
Figure 2:
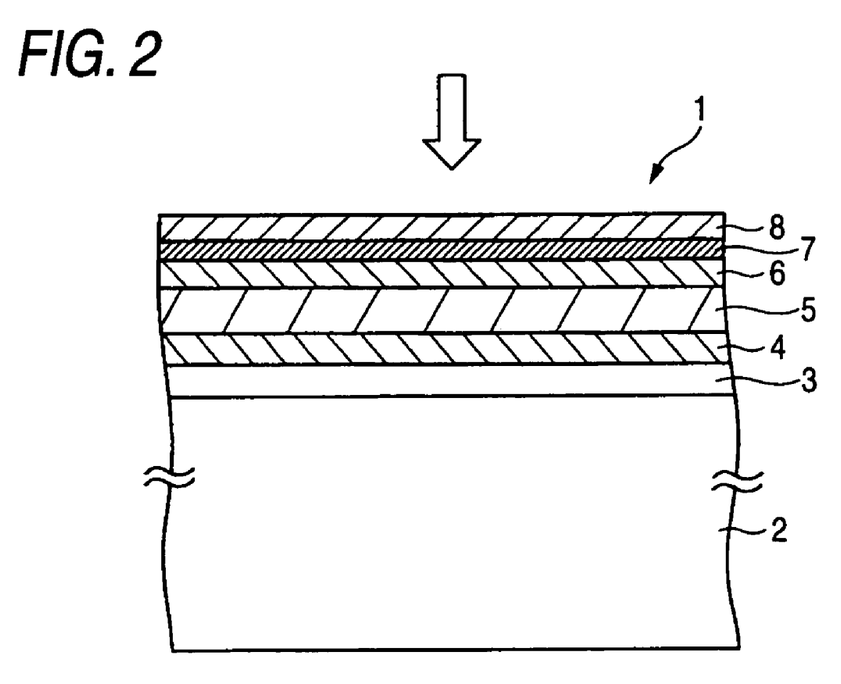
FIG. 2 is a sectional view for indicating an enlarged portion of the optical recording medium, which is indicated by symbol "A" of FIG. 1.

FIG. 1 is a perspective view for schematically showing an optical recording medium 1 according to a preferred embodiment mode of the present invention. FIG. 2 is a sectional view for showing an enlarged portion of the optical recording medium of FIG. 1, which is indicated by symbol "A."

As indicated in FIG. 2, the optical recording medium 1 according to this embodiment mode is provided with a supporting substrate 1. A reflection layer 3, a third dielectric layer 4, an optical absorption layer 5, a second dielectric layer 6, a recording layer 7, and a first dielectric layer 8 have been layered on the supporting substrate 2 in this order.

In this embodiment mode, the optical recording medium 1 has been constituted in such a manner that since a laser beam is irradiated from an arrow direction shown in FIG. 2, data is recorded and the recorded data is readout.

The supporting substrate 2 functions as a supporting member used to secure a mechanical strength which is required for the optical recording medium 1.

As a material used to form the supporting substrate 2, if a material can function as the supporting member of the optical recording medium 1, then there is no specific limitation. The supporting substrate 2 may be formed by, for example, glass, ceramics, a resin, and the like. Among these forming materials, a polycarbonate resin and an olefin resin are especially preferable in view of processing characteristics, optical characteristics, and the like.

In this embodiment mode, the supporting substrate 2 has been formed by employing the polycarbonate resin, and has a thickness of approximately 1.1 mm.

Also, both grooves and lands (not shown) have been alternately formed on the surface of the supporting substrate 2. The grooves and/or the lands which have been formed on the surface of the supporting substrate 2 may function as guide tracks of a laser beam in the case that data is recorded and data is readout.

The reflection layer 3 may play such a role that this reflection layer 3 reflects a laser beam entered from the side of the first dielectric layer 8, and again projects the reflected laser beam from the first dielectric layer 8.

As to a material for forming the reflection layer 3, if any material can reflect a laser beam, then there is no specific restriction. The reflection layer 3 may be formed by employing at least one sort of such an element which is selected from a group consisted of Mg, Al, Ti, Cr, Fe, Co, Ni, Cu, Zn, Ge, Pt, Au, Ag, Pd, Nd, In, Sn, and Bi.

Although there is no specific limitation in a thickness of the reflection layer 3, it is preferable that the reflection layer 3 may have a thickness from 5 nm to 200 nm.

The third dielectric layer 4 owns a function capable of protecting both the supporting substrate 2 and the reflection layer 3, and also owns another function capable of physically and chemically protecting the optical absorption layer 5 which is formed on this third dielectric layer 4.

As to a dielectric material used to form the third dielectric layer 4, there is no specific limitation. The third dielectric layer 4 may be formed by using, for example, an oxide, a sulfide, a nitride, or a dielectric material made by combining these oxide, sulfide, and nitride with each other. The third dielectric layer 4 is preferably formed by an oxide, a nitride, a sulfide, a fluoride, or a composite material made of these oxide, nitride, sulfide, and fluoride, which contain at least one sort of metal selected from a group consisted of Si, Zn, Al, Ta, Ti, Co, Zr, Pb, Ag, Sn, Ca, Ce, V, Cu, Fe, Mg.

The third dielectric layer 4 may be formed on the surface of the reflection layer 3 by performing a physical vapor deposition method with employment of a chemical seed containing, for example, the structural element of the third dielectric layer 4. As the physical vapor deposition method, a vapor deposition method, a sputtering method, and the like may be employed.

Although a thickness of the third dielectric layer 4 is not specifically limited, such thicknesses defined from 10 nm to 140 nm may be preferably employed.

The optical absorption layer 5 owns such a function that when a laser beam whose power has been set to recording power is irradiated to the optical recording medium 1, the optical absorption layer 5 absorbs the irradiated laser beam to generate heat, and transfers the generated heat to the recording layer 7.

In this embodiment mode, the optical absorption layer 5 has been formed by an alloy which owns a high optical absorbing coefficient and a low thermal conductivity, and also, contains at least one of Sb and Te.

As the above-explained alloy containing at least any one of Sb and Te which are contained in the optical absorption layer 5, such an alloy is more preferable which owns a composition expressed by either $(Sb_aTe_{1-a})_{1-b}M_b$, or $\{(GeTe)_c(Sb_2Te_3)_{1-c}\}_dX_{1-d}$. In this composition, the element "M" indicates an element except for Sb and Te, and the element "X" indicates an element except for Sb, Te, and Ge.

When the alloy containing at least any one of Sb and Te which are contained in the optical absorption layer 5 owns a composition which is expressed by $(Sb_aTe_{1-a})_{1-b}M_b$, symbols "a" and "b" are preferably equal to $0 \leq a \leq 1$ and $0 \leq b \leq 0.25$. When symbol "b" has exceeded 0.25, there is a risk that an optical absorption coefficient may become lower than the value required for the optical-absorption layer 5. Also, there is another risk that a thermal conductivity may become lower than the value required for the optical absorption layer 5.

Although the element "M" is not especially limited, this element "M" may preferably contain as a major component at least one sort of such an element which is selected from a group consisted of In, Ag, Au, Bi, Se, Al, Ge, P, H, Si, C, V, W, Ta, Zn, Mn, Ti, Sn, Pb, Pd, N, O, and a rare earth element (Sc, Y and lanthanoid).

On the other hand, when the alloy containing at least any one of Sb and Te which are contained in the optical absorption layer 5 owns a composition which is expressed by $\{(G_eT_e)_c(Sb_2Te_3)_{1-c}\}_dX_{1-d}$, symbols "c" and "d" are preferably equal to $1/3 \leq c \leq 2/3$ and $0.9 \leq d$.

Although the element "X" is not especially limited, this element "M" may preferably contain as a major component at least one sort of such an element which is selected from a group consisted of In, Ag, Au, Bi, Se, Al, P, H, Si, C, V, W, Ta, Zn, Mn, Ti, Sn, Pb, Pd, N, O, and a rare earth element.

The optical absorption layer 5 may be formed on the surface of the third dielectric layer 4 by a physical vapor deposition method using a chemical element which contains the structural element of the optical absorption layer 5. As the physical vapor deposition method, a vapor deposition method, a sputtering method, and the like may be employed.

The optical absorption layer 5 may preferably own a thickness defined from 5 nm to 100 nm. In the case that a thickness of the optical absorption layer 5 is smaller than 5 nm, the optical absorption ratio becomes excessively low. On the other hand, if a thickness of the optical absorption layer 5 exceeds 100 nm, as will be discussed later, then there is a risk that the optical absorption layer 5 can be hardly deformed when a bubble pit is formed in the recording layer 7.

The second dielectric layer 6 owns such a function capable of physically and chemically protecting the recording layer 7 in combination with the first dielectric layer 8 (will be discussed later).

Although there is no specific limitation in a material used to form the second dielectric layer 6, this second dielectric layer 6 may be formed by employing a material similar to that of the third electric layer 4. Also, similar to the third dielectric layer 4, the second dielectric layer 6 may be formed by a physical vapor deposition method with employment of a chemical seed containing the structural element of the second dielectric layer 6, The second dielectric layer 6 is preferably formed in such a manner that this second dielectric layer 6 owns a thickness defined from 5 nm to 100 nm.

The recording layer 7 corresponds to such a layer on which data is recorded. When data is recorded, a recorded mark is formed on the recording layer 7.

In this embodiment mode, the recording layer 7 contains a platinum oxide "PtOx" as a major component.

In this embodiment mode, in order that a reproduction signal having a high C/N ratio is obtained even in such a case that a length of a recorded mark and a length of a blank region between the adjoining recorded marks are smaller than limits of resolution, symbol "x" of "PtOx" is preferably equal to or larger than 1.0 but less than 3.0 (i.e. $1.0 \leq x \leq 3.0$).

The recording layer 7 may be formed on the surface of the second dielectric layer 6 by performing a physical vapor deposition method with employment of a chemical seed containing, for example, the structural element of the recording layer 7 as the major component. As the physical vapor deposition method, a vapor deposition method, a sputtering method, and the like may be employed.

A thickness of the recording layer 7 is preferably equal to 2 nm to 20 nm, and more preferably equal to 4 nm to 20 nm. When a thickness of the recording layer 7 is smaller than 2 nm, there is a risk that the recording layer 7 cannot be formed as a continuous film, whereas when a thickness of the recording layer 7 exceeds 20 nm, there is another risk that the recording layer 7 can be hardly deformed, and a recording sensitivity thereof may be lowered.

The first dielectric layer 8 owns such a function capable of physically and chemically protecting the recording layer 7.

Although the material used to form the first dielectric layer 8 is not specifically limited, the first dielectric layer 8 may be formed by employing a material similar to that of the third dielectric layer 4. Also, similar to the third dielectric layer 4, the first dielectric layer 8 may be formed by performing a physical vapor deposition method with employment of a chemical seed containing the structural element of the first dielectric layer 8.

Figure 3:
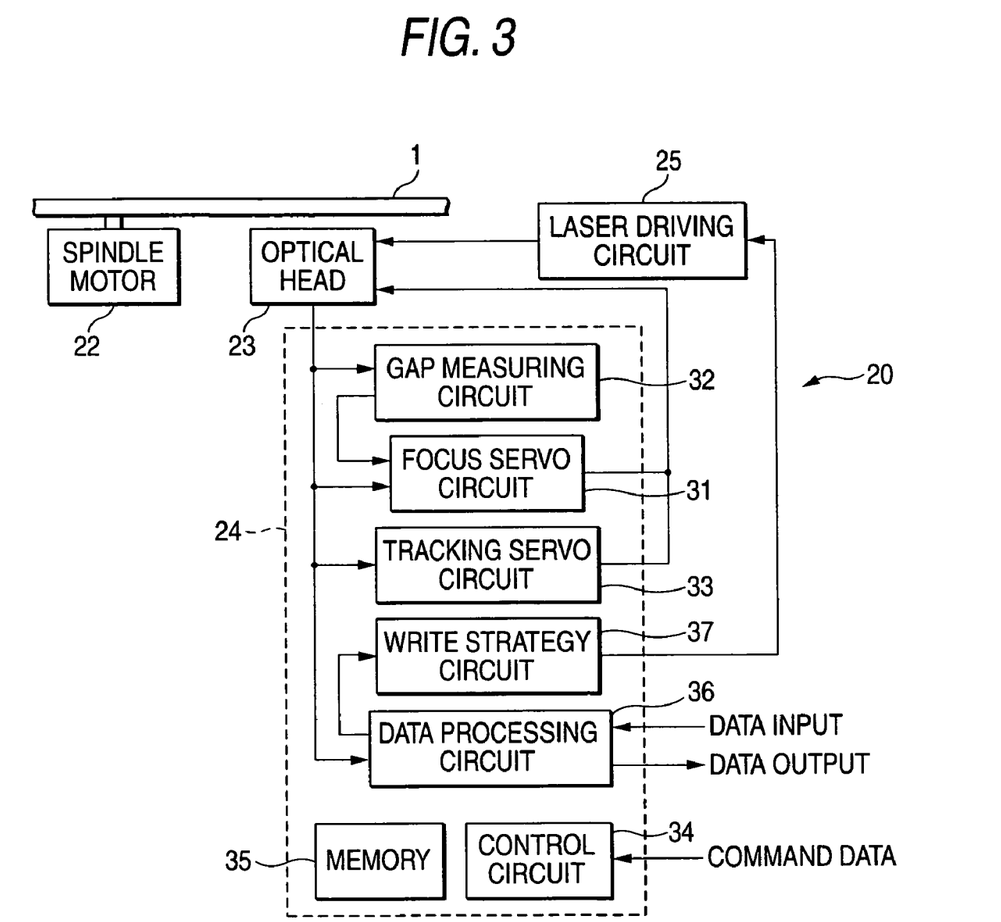
FIG. 3 is a block diagram for schematically representing an arrangement of a data recording and readingout apparatus according to a preferred embodiment mode of the present invention.

FIG. 3 is a block diagram for schematically indicating an arrangement of a data recording and readingout apparatus 20 which is employed so as to record data on the optical recording medium 1, and to readout data from the optical recording medium 1.

As indicated in FIG. 3, the data recording and readingout apparatus 20, according to this embodiment mode, has been equipped with a spindle motor 22, an optical head 23, a controller 24, and a laser driving circuit 25. The spindle motor 22 rotates the optical recording medium 1. The optical head 23 emits a laser beam toward the optical recording medium 1, and detects a laser beam reflected by the optical recording medium 1. The controller 24 controls both the operation of the spindle motor 22 and the operation of the optical head 23, and also, performs a predetermined signal process operation with respect to either externally inputted data or data readout from the optical recording medium 1. The laser driving circuit 25 supplies a laser drive signal to the optical head 23.

As indicated in FIG. 3, the controller 24 has been equipped with a focus servo circuit 31, a gap measuring circuit 32, a tracking servo circuit 33, a control circuit 34, a memory 35, a data processing circuit 36, and a write strategy circuit 37. The focus servo circuit 31 produces a focus control signal in response to a focus error signal read out from the optical recording medium 1. The gap measuring circuit 22 measures a distance between the optical recording medium 1 and the optical head 23. The tracking servo circuit 33 produces a tracking control signal in response to a tracking error signal read out from the optical recording medium 1. The control circuit 34 controls an entire operation of the controller 24.

The memory 35 is constituted by a DRAM, an SRAM, or a flash memory, or the like. The memory 35 stores thereinto program data which is used to control the entire operation of the data recording and readingout apparatus 20, and stores thereinto various sorts of data which are employed in process operations executed in the controller 24.

The control circuit 34 is employed so as to control entire operations of the controller 24, and outputs control signals to the respective internal circuits of the data recording and readingout apparatus 20 in response to a key input by user, or command data corresponding to a button input.

The data processing circuit 36 functions as an encoder and a decoder. When data is recorded on the optical recording medium 1, the encoder performs an encoding process operation with respect to user data which is externally inputted by a user. When data is readout from the optical recording medium 1, the decoder executes a decoding process operation with respect to a reproduction signal readout from the optical recording medium 1.

The write strategy circuit 37 produces a laser power control signal used to modulate power of a laser beam based upon the data which has been encoding-processed by the data processing circuit 36.

Figure 4:
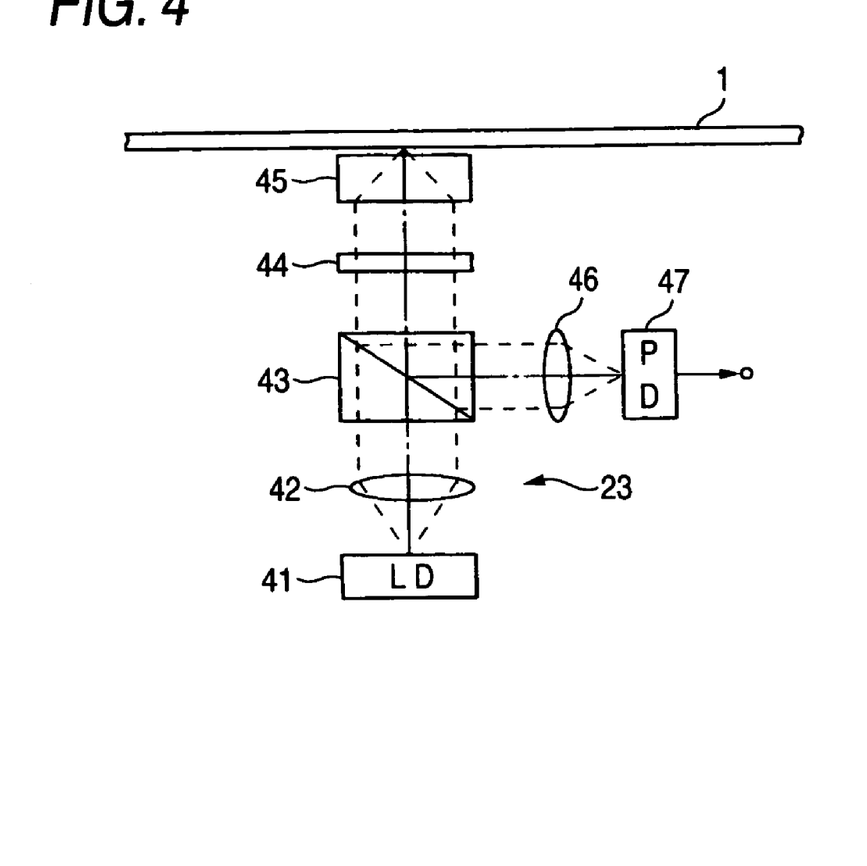
FIG. 4 is a block diagram for schematically showing a structure of an optical head.

FIG. 4 is a block diagram for schematically indicating a structure of the optical head 23.

As indicated in FIG. 4, the optical head 23 has been provided with a laser diode 41 for emitting a laser beam, a collimator lens 42, a polarizing beam splitter 43, a ¼ wavelength plate 44, a lens unit 45, a collective lens 46, and a photodetector 47. The collimator lens 42 converts the laser beam emitted from the laser diode 41 into collimated light.

The polarizing beam splitter 43 transmits the laser beam which is entered via the collimator lens 42, and on the other hand, reflects a laser beam which is reflected by the optical recording medium 1 to conduct the reflected laser beam to the photodetector 47. The ¼ wavelength plate 44 converts a linearly polarized laser beam which is entered from the polarizing beam splitter 43 into a circularly polarized laser beam. The lens unit 45 converges a laser beam which is entered via the ¼ wavelength plate 44 to emit the converged laser beam to the optical recording medium 1. The collective lens 46 collects laser beams which are entered via the polarizing beam splitter 43. The photodetector 47 detects a strength of the laser beam collected by the collective lens 46.

Figure 5:
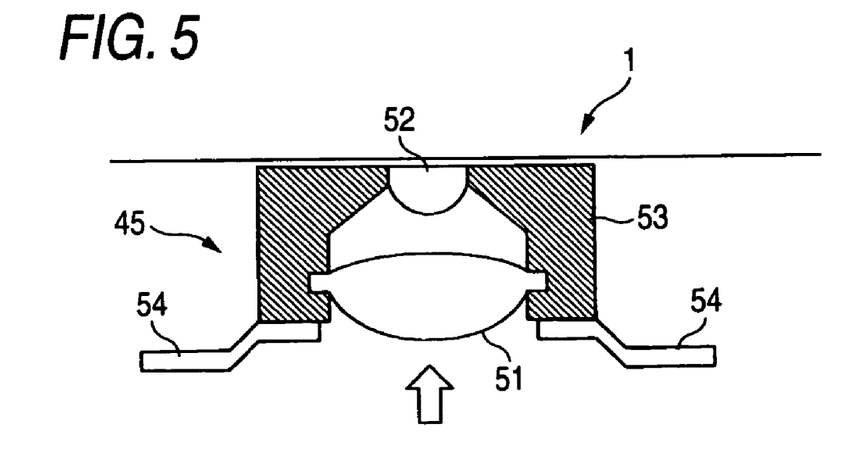
FIG. 5 is a sectional view for schematically indicating a structure of a lens unit.

FIG. 5 is a sectional view for schematically indicating a structure of the lens unit 45.

As indicated in FIG. 5, the lens unit 45 has been provided with an objective lens 51, a solid immersion lens (SIL) 52, a head slider 53, and a suspension 54. The solid immersion lens 52 is arranged between the objective lens 51 and a light incident plane of the optical recording medium 1. The head slider 53 holds both the objective lens 51 and the solid immersion lens 52. The suspension 54 has been suspended on the head slider 53.

The objective lens 51 corresponds to such a lens which converges a laser beam entered via the ¼ wavelength plate 44, and enters the converged laser beam to the solid immersion lens 52. Both a plane on the light incident side and another plane on the light projection side have been constituted by spherical planes. Although a numerical aperture "NA" of the objective lens 51 is not specifically limited, this objective lens 51 owns such a numerical aperture "NA" defined from 0.4 to 0.6.

The solid immersion lens 52 corresponds to such a lens which further converges the laser beam which has been converged by the objective lens 51. In this solid immersion lens 52, a plane on the light incident side has been constructed of a spherical plane, whereas a plane on the light projection side has been constructed of a flat plane. Also, the solid immersion lens 52 owns a refractive index "n" defined from 1.5 to 2.5, and has such a higher refractive index than a refractive index "$n_0(n_0=1)$" within air. In such a case that a laser beam is irradiated via this solid immersion lens 52 onto the optical recording medium 1, a spot diameter of the laser beam becomes $\lambda/(n^2 \cdot NA)$, and therefore, the beam spot diameter can be made smaller, as compared with another beam spot diameter "$\lambda/NA$" in the case that the laser beam is irradiated only via the objective lens 51 onto the optical recording medium 1. In this case, symbols "$\lambda$", "n", and "NA" represent a wavelength of the laser beam, a refractive index of the solid immersion lens 52, and a numerical aperture of the objective lens 51, respectively.

The head slider 53 is employed so as to support both the objective lens 51 and the solid immersion lens 52, and has been constituted in such a manner that the head slider 53 may obtain floating force due to an air stream which is produced when the optical recording medium 1 is rotated, and thus, may float the objective lens 51 and the solid immersion lens 52.

Also, while a portion of a bottom plane of the head slider 53 is constituted by a conductor, this head slider 53 may constitute one sort of a capacitor with respect to the optical recording medium 1. As a result, in the case that a distance between the bottom plane of the head slider 53 and the surface of the optical recording medium 1 is changed, the capacitance of the above-explained capacitor is changed. As a consequence, since this change of the capacitance is measured by the above-described gap measuring circuit 32, a distance of a gap between the surface of the solid immersion lens 52 and the surface of the optical recording medium 1 may be measured.

The suspension 54 is employed in order to support the head slider 53 and also to adjust the distance between the head slider 53 and the surface of the optical recording medium 1. The elastical characteristic of the suspension 54 has been adjusted in such a manner that when the head slider 53 is floated, the distance between the head slider 53 and the surface of the optical recording medium 1 may become approximately 50 nm to 100 nm.

The data recording and readingout apparatus 20 having the above-explained arrangement records data on the optical recording medium 1 in the below-mentioned manner.

When the optical recording medium 1 is firstly set on the data recording and readingout apparatus 20, the controller 24 drives the spindle motor 22 so as to rotate the optical recording medium 1. When the optical recording medium 1 is rotated, the optical head 23 may receive floating force to be floated, and is traveled, while the distance between this optical head 23 and the surface of the optical recording medium 1 is maintained from approximately 50 nm to 100 nm.

Next, the controller 24 outputs a laser drive signal via the laser driving circuit 25 to the optical head 23 in order to emit such a laser beam having readout power from the laser diode 41. The emitted laser beam is converted into collimated laser light by the collimator lens 42, and thereafter, this collimated laser beam passes through the polarizing beam splitter 43 and then, is irradiated via both the ¼ wavelength 44 and the lens unit 45 onto the optical recording medium 1.

As a result, the laser beam is reflected by the optical recording medium 1, and then, the reflected laser beams are entered to both a tracking control-purpose photodetector and a focus control-purpose photodetector (not shown). Subsequently, a predetermined calculating process operation is carried out with respect to the detection signals outputted from the photodetectors, so that both a tracking error signal and a focus error signal are produced so as to be outputted to both the focus servo circuit 31 and the tracking servo circuit 33.

Also, at this time, the distance between the surface of the solid immersion lens 52 and the surface of the optical recording medium 1 is measured by the gap measuring circuit 32, and then, the measured distance signal is outputted to the focus servo circuit 31.

The tracking servo circuit 33 produces a tracking control signal based upon the tracking error signal, and the focus servo circuit 31 produces a focus control signal based upon the gap signal outputted from the gap measuring circuit 32 and the focus error signal. The tracking servo circuit 33 outputs the tracking control signal and the focus servo circuit 31 outputs the focus control signal to the optical head 23.

As a result, the position of the optical head 23 is controlled in order that the laser beam automatically follows the tracks of the optical recording medium 1, and further, the floating amount of the optical head 23 is fine-adjusted in order that the laser beam is focused onto the optical recording medium 1.

Next, user data is entered to the data recording and readingout apparatus 20, and then, the data processing circuit 36 applies error correction-purpose parity data to the entered user data, and performs a predetermined coding processing operation with respect to the resultant user data so as to be coded.

The data which has been coded is outputted to the write strategy circuit 37, and the write strategy circuit 37 produces a laser power control signal based upon the data which has been coded, while the laser power control signal is used in order to modulate a laser beam outputted from the laser diode 41.

The laser power control signal produced by the write strategy circuit 37 is outputted to the laser driving circuit 25, and thus, the laser driving circuit 25 modulates power of the laser beam emitted from the optical head 23 to produce a recording-purpose laser beam having the modulated power which is irradiated to the optical recording medium 1.

Figure 6:
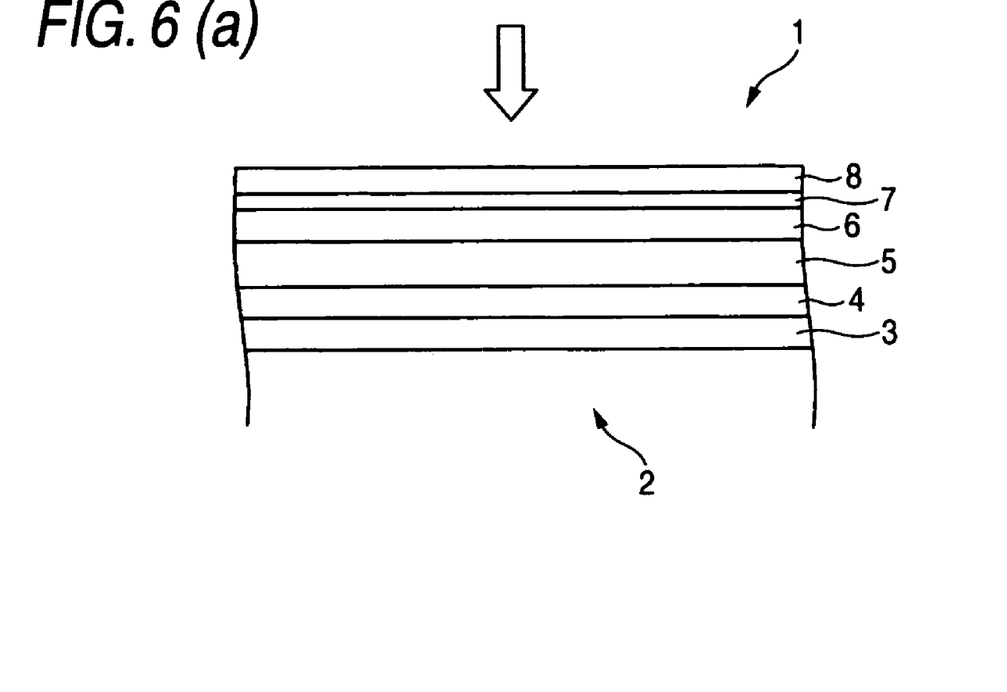

FIG. 6($a$) is a sectional view for showing a partially enlarged portion of the optical recording medium 1 before data is recorded. FIG. 6($b$) is a sectional view for showing the partially enlarged portion of the optical recording medium 1 after data has been recorded.

When the laser beam which has been modulated by the recording-purpose power is irradiated onto the optical recording medium 1, a region of the optical absorption layer 5 where the laser beam is irradiated is heated. The heat produced in the optical absorption layer 5 is transferred to the recording layer 7, so that the temperature of the recording layer 7 is increased.

As to the platinum oxide which is contained as the major component in the recording layer 7, since the transmission characteristic thereof with respect to a laser beam is high, even if the laser beam is irradiated onto the recording layer 7, this recording layer 7 itself can be hardly heated, and also, it is practically difficult that the temperature of the recording layer 7 is increased higher than, or equal to the decomposition temperature of the platinum oxide. However, in this embodiment mode, since the optical absorption layer 5 has been provided, this optical absorption layer 5 is heated, and then, the heat produced by the optical absorption layer 5 is transferred to the recording layer 7, so that the temperature of the recording layer 7 is increased.

The recording layer 7 is heated at the temperature higher than, or equal to the decomposition temperature of the platinum oxide in the above-explained manner, and then, the platinum oxide which has been contained as the major component in the recording layer 7 is decomposed into both platinum and oxygen.

As a result, an shown in FIG. 6($b$), the platinum oxide is decomposed, a bubble pit 7$a$ is formed in the recording layer 7 by produced oxygen gas, and then, very fine particles 7$b$ made of platinum are dispersed into the bubble pit 7$a$.

At the same time, as indicated in FIG. 6($b$), the recording layer 7 is deformed in combination with both the optical absorption layer 5 and the second dielectric layer 6 by pressure of the produced oxygen gas.

Such a region in which the bubble pit 7$a$ is formed in the above-described manner, and also, the optical absorption layer 5, the second dielectric layer 6, and the recording layer 7 have been deformed owns such an optical characteristic from that of other regions. As a result, a recorded mark may be formed by the region in which the bubble pit 7$a$ is formed, and also, the optical absorption layer 5, the second dielectric layer 6, and the recording layer 7 are deformed.

Among the recorded marks and the blank regions between the adjoining recorded marks, such recorded marks and blank regions are involved, the lengths of which are shorter than the limits of resolution, and a recorded mark train whose length is shorter than the limit of resolution is formed.

In this embodiment mode, since the recording layer 7 contains the platinum oxide whose decomposition temperature is high as the major component, when the laser beam which has been set to the recording-purpose power is irradiated so as to form the recorded mark, even in such a case that the heat is diffused from the region to which the laser beam has been irradiated to the recording layer 7 located at the peripheral portion thereof, it is possible to avoid that the decomposition reaction of the platinum oxide occurs in such a region other than the region to which the laser beam has been irradiated. As a consequence, the bubble pit 7a is formed in the desirable region of the recording layer 7, so that the recorded mark can be formed.

On the other hand, the data which has been recorded on the optical recording medium 1 is readout by the data recording and readingout apparatus 20 in the below-mentioned readingout manner.

When the optical recording medium 1 is set on the data recording and readingout apparatus 20, first of all, both a focus control operation and a tracking control operation are carried out by the controller 24, and further, address data is produced by the controller 24.

Next, the controller 24 moves the optical head 23 to such an address at which data to be readout has been recorded, and irradiates a laser beam emitted from the optical head 23 via the objective lens 51 and the solid immersion lens 52 onto the recorded mark train which has been formed on the optical recording medium 1.

Thereafter, the laser beam is reflected by the optical recording medium 1, and then, this reflected laser beam is entered via the solid immersion lens 52, the objective lens 51, the ¼ wavelength plate 44, the polarization beam splitter 43, and the collective lens 46 to the photodetector 47. A strength of the laser beam is detected by the photodetector 47 in the above-explained manner, so that a reproduction signal is produced.

In this embodiment mode, since the data recording and readingout apparatus has been arranged in such a manner that the laser beam is irradiated via the objective lens 51 and the solid immersion lens 52 to the optical recording medium 1, the spot diameter of the laser beam can be made small, and the limit of resolution can be decreased from "$\lambda/4NA$" to "$\lambda/(4 \cdot n^2 \cdot NA)$." As a result, such a data which has been constituted by the smaller recorded mark train can be readout, as compared with such a case that the laser beam is irradiated via only the objective lens 51 so as to readout the data.

In addition, in this embodiment mode, as shown in FIG. 6(b), the bubble pit 7a has been formed in the recording layer 7, and the very fine particles 7b made of platinum have been dispersed inside the bubble pit 7a, so that the recorded marks have been formed to record the data. In such a case that even if the lengths of the recorded marks which constitute the recorded mark train and the lengths of the blank regions between the adjoining recorded marks are shorter than, or equal to the limit of restriction, the data can be readout.

As previously explained, in accordance with this embodiment mode, the resolution limit is decreased from "$\lambda/4NA$" to "$\lambda/(4 \cdot n^2 NA)$", and in addition, such a data can be readout which has been constituted by the recorded mark train having the length which is shorter than, or equal to this decreased limit of resolution "$\lambda/(4 \cdot n^2 \cdot NA)$." As a consequence, such a recorded mark train having a very short length which is shorter than, or equal to "$\lambda/(4 \cdot n^2 \cdot NA)$" may be formed in order that the data can be recorded. As a consequence, the recording capacity of the optical recording medium can be largely increased.

A reproduction signal which has been produced by the photodetector 47 is processed by executing both a waveform shaping process operation and a Viterbi decoding process operation, and then, the processed reproduction signal is outputted to the data processing circuit 36. Thus, this data processing circuit 36 performs both an error correcting process operation and a decoding process operation with respect to the supplied reproduction signal.

The user data may be readout in the above-described manner, and then, the readout user data may be outputted to the external unit, or may be stored in the memory 35 as reproduction data.

The present invention is not limited only to the above-described embodiment mode, but may be freely modified within the technical scope defined in Claims for a patent. Apparently, these modifications may be involved in the technical scope of the present invention.

For instance, in the optical recording medium 1 shown in FIG. 1 and FIG. 2, the recording layer 7, the second dielectric layer 6, and the optical absorption layer 5 have been sequentially stacked from the light incident plane of the laser beam. The present invention is not limited only to this stacked structure, but may be freely modified. For example, the recording layer 7, the second dielectric layer 6, and the optical absorption layer 5 may be alternatively stacked from the opposite side of the light incident plane of the laser beam. Otherwise, an optical absorption layer, a dielectric layer, a recording layer, another dielectric layer, and another optical absorption layer may be sequentially stacked. In other words, in accordance with the present invention, an optical recording medium may merely contain a layered structure which has been formed by sandwiching at least a dielectric layer between a recording layer and an optical absorption layer.

What is claimed is:

1. A data recording and readingout system comprising:
an optical recording medium having a layered structure including a recording layer, an optical absorption layer and at least one dielectric layer between said recording layer and said optical absorption layer, said optical recording medium being configured to record data by a recorded mark train including a plurality of recorded marks; and
a data recording and readingout apparatus comprising a light source which irradiates a laser beam having a wavelength $\lambda$ an objective lens positioned to receive said laser beam from said light source and a solid immersion lens positioned to receive said laser beam from said objective lens, said objective lens having a numerical aperture NA defined from 0.4 to 0.6, said solid immersion lens having a refractive index n defined from 1.5 to 2.5, said data recording and readingout apparatus being configured to record or read out said data from said optical recording medium by irradiating said optical recording medium with said laser beam having a limit of resolution satisfying $\lambda/(4 \cdot n^2 \cdot NA)$ via said objective lens and said solid immersion lens such that said optical recording medium makes each of said recorded marks which is smaller or equal to said limit of resolution.

2. An optical recording medium as claimed in claim 1, wherein said recording layer of said layered structure comprises a noble metal oxide as a major component.

3. An optical recording medium as claimed in claim 2, wherein said noble metal oxide is a platinum oxide, and said platinum oxide is provided such that when said laser beam is irradiated onto said platinum oxide, said platinum oxide is decomposed into platinum and oxygen.

4. An optical recording medium as claimed in claim 1, wherein both said dielectric layer and said optical absorption layer are structured such that said dielectric layer and said optical absorption layer are deformed in connection with a volume change of said recording layer when said recorded mark train is formed on the recording layer.

5. A data recording and readingout apparatus for recording or reading out data on an optical recording medium having a layered structure comprising a recording layer, an optical absorption layer and at least one dielectric layer between said recording layer and said optical absorption layer, comprising:

a light source which irradiates a laser beam having a wavelength $\lambda$;

an objective lens having a numerical aperture NA defined from 0.4 to 0.6; and a solid immersion lens having a refractive index n defined from 1.5 to 2.5, said solid immersion lens being positioned between said optical recording medium and said objective lens, wherein said light source, said objective lens and said immersion lens are configured such that said laser beam has a limit of resolution satisfying $\lambda/(4 \cdot n^2 \cdot NA)$ and irradiates said optical recording medium to record data by forming a recorded mark train including a plurality of recorded marks, each of which is made smaller than or equal to said limit of resolution.

6. A data recording and readingout system as claimed in claim 5, wherein said recording layer of said layered structure comprises a noble metal oxide as a major component.

7. A data recording and readingout system as claimed in claim 6, wherein said noble metal oxide is a platinum oxide, and said platinum oxide is provided such that when said laser beam is irradiated onto said platinum oxide, said platinum oxide is decomposed into platinum and oxygen.

8. A data recording and readingout system as claimed in claim 5, wherein both said dielectric layer and said optical absorption layer are structured such that said dielectric layer and said optical absorption layer are deformed in connection with a volume change of said recording layer when said recorded mark train is formed on the recording layer.

* * * * *